Dec. 26, 1922.
H. A. WAHLEN.
JIG USED IN THE MANUFACTURE OF PIANO PLATES.
FILED JUNE 9, 1921.
1,440,040.
2 SHEETS—SHEET 1.
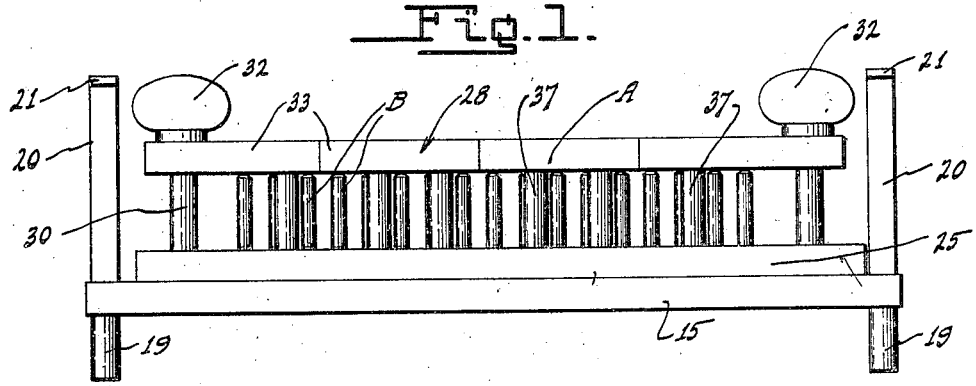
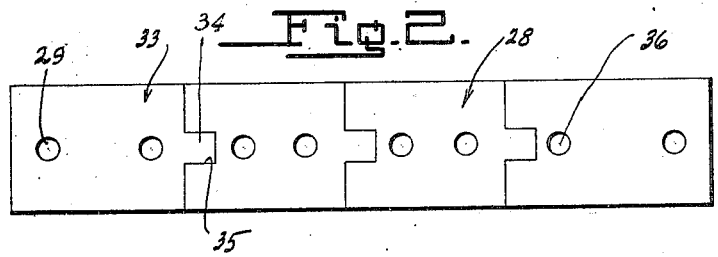
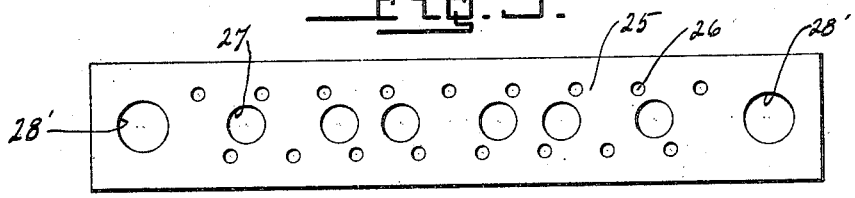
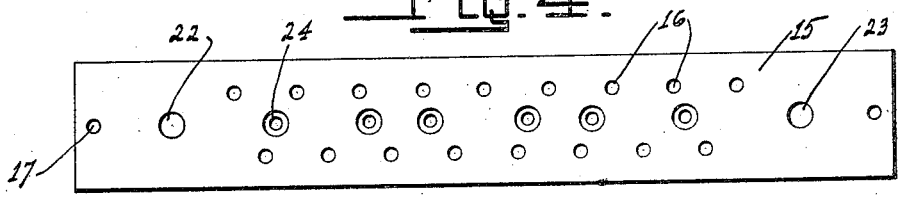
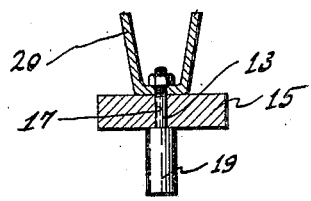
Inventor
Henry A. Wahlen
By Lancaster and Allwine
Attorneys

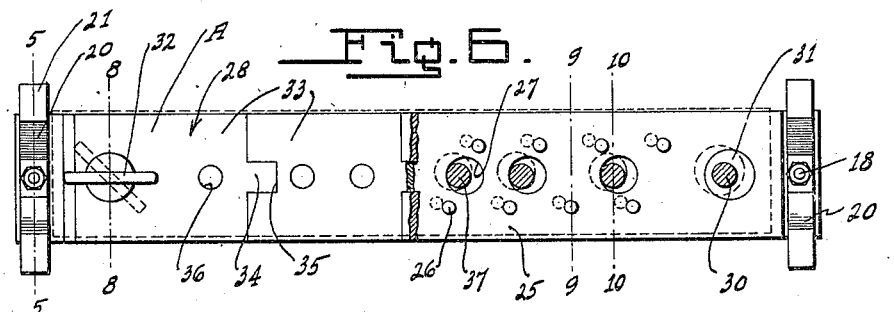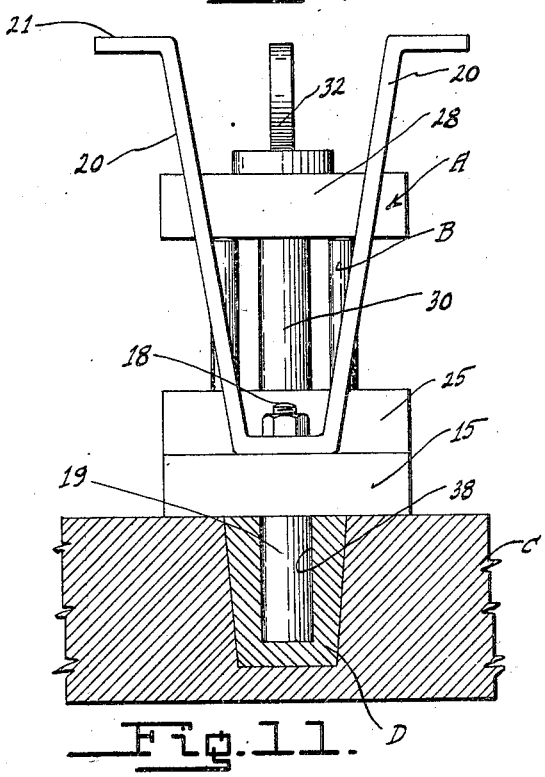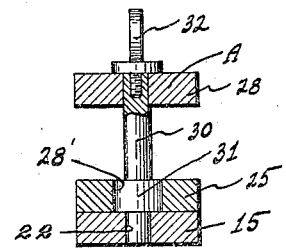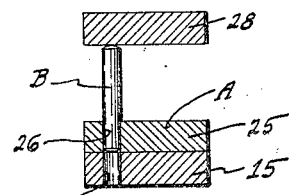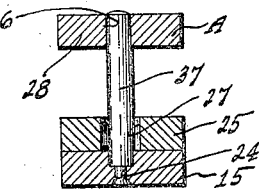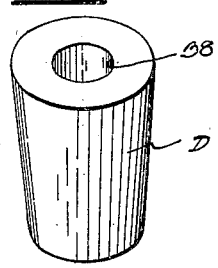

Patented Dec. 26, 1922.

1,440,040

UNITED STATES PATENT OFFICE.

HENRY A. WAHLEN, OF RACINE, WISCONSIN.

JIG USED IN THE MANUFACTURE OF PIANO PLATES.

Application filed June 9, 1921. Serial No. 476,342.

*To all whom it may concern:*

Be it known that I, HENRY A. WAHLEN, a citizen of the United States, residing at Racine, in the county of Racine and State of Wisconsin, have invented certain new and useful Improvements in Jigs Used in the Manufacture of Piano Plates, of which the following is a specification.

This invention relates to molding apparatus and more particularly to apparatus for molding piano plates and the primary object of the invention is to provide a novel means for setting the pins in the mold, so that they will be cast in during the molding process thereby eliminating the time and trouble heretobefore experienced in placing the pins in position and the necessity of employing skilled labor for this purpose.

Another object of the invention is to provide a novel jig or frame for supporting the pins in their correct position in relation to each other and a novel means for holding the pins against accidental displacement, while the jig or frame is being placed in position and a novel means for releasing the pins and for forcing the same into place in the mold.

A further object of the invention is to provide a novel means for supporting the jig in the mold while the pins are being forced in position, said means being carried by the pattern and held in place in the mold by the ramming of the green sand during the forming of the impression.

A still further object of the invention is to provide an improved jig, for holding a plurality of pins, studs, or the like for placing the same in position in a mold, so that the pins, studs, bolts or the like can be cast in the casting during the molding operation, of the above character, which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings.

Figure 1 is a side elevation of the improved jig or frame.

Fig. 2 is a plan view of the push plate utilized for forcing the pins in position in the mold.

Fig. 3 is a plan view of the lock plate for the pins.

Fig. 4 is a plan view of the guide plate for the pins.

Fig. 5 is a detail transverse section taken on the line 5—5 of Figure 6, illustrating the means of connecting the guide pins and the supporting brackets to the guide plate.

Fig. 6 is a top plan view of the improved jig or frame, showing portions thereof broken away.

Fig. 7 is an enlarged end elevation of the improved jig, showing the same in position in a mold for forcing the pins into the same, the mold being shown in fragmentary section.

Fig. 8 is a detail transverse section through the improved jig or frame taken on the line 8—8 of Figure 6.

Fig. 9 is a detail transverse section through the improved jig taken on the line 9—9 of Figure 6.

Figure 10 is a transverse section taken on the line 10—10 of Figure 6, and

Fig. 11 is an enlarged detail perspective view of one of the guides utilized for receiving the guide pins carried by the jig or frame.

Referring to the drawings in detail, wherein similar reference characters designate corresponding parts throughout the several views, the letter A indicates the improved jig or frame for setting the pins B in the mold C; and D designates the guides utilized for receiving the guide pins carried by the jig.

The improved jig A includes a longitudinally extending guide or base plate 15 which is provided with a plurality of openings 16, which are adapted to receive the pins, which are to be forced in the mold for attachment to the piano plates. The openings 16 can be of any suitable configuration in order to conform to the shape of the pins, studs, or the like, which are to be forced into the mold and these openings also can be arranged in any desired formation, so that the pins, studs or other devices to be cast in the casting will project therefrom in the desired pattern. The jig as shown is particularly adapted for placing the pins of piano plates in position and the openings therefor are cylindrical shaped in cross section and arranged in two rows, which are positioned in stepped relation to each other as can be clearly seen by referring to Figures 4 and 3 of the drawings. The rows of openings 16 terminate short of the terminals of the plate 15 and the plate adjacent to its opposite ends is provided with openings 17, which are arranged at the longitudinal center of the plates. These openings 17 are adapted to receive the stems 18 of guide pins 19, the purpose of which, will be hereinafter more fully described. The stems 18 project through the upper surface of the plate 15 and receive the supporting legs or brackets 20. These brackets or supporting members 20 are of a substantially V-shape and are provided with outwardly extending supporting feet 21. It can be seen that these members form a support for the plate 15 of the jig, when the same is placed in an inverted position ready for loading or receiving the pins. The plate 15 is also provided adjacent to its outer ends with openings 22 and 23 and socket openings 24, the purpose of which will be hereinafter more fully described.

While the plate 15 has been shown with an outer plane face it is to be understood that the same can be shaped to conform to the configuration of the impression in the mold with which it is to be used.

A locking and guiding plate 25 is arranged on the upper surface of the plate 15 and this plate terminates short of the ends of the plate 15. The plate 25 is also provided with the rows of pin receiving openings 26 which are adapted to be brought into and out of alignment with the pin openings 16 formed in the plate 15, as will be hereinafter more fully described. The plate 25, at the longitudinal center thereof is provided with a plurality of relatively large guide openings 27, which are adapted to extend above the socket openings 24. The plate is also provided adjacent to its ends with relatively large openings 28', which are positioned above the openings 22 and formed in the plate 15.

The pusher plate 28 is arranged above the locking and guiding plate 25 and is of substantially the same length and has its terminal provided with bearing openings 29, which are arranged in direct alignment with the openings 22 and 23.

These openings 22, 23 and 29 are adapted to rotatably support the bolts or operating members 30, which have eccentrics 31 formed thereon. These eccentrics 31 are mounted within the openings 28' formed in the plate 25 and by moving or rotating the bolts 30, the eccentrics 31 can be actuated in order to bring the openings 26 formed in the plate 25 into or out of alignment with the openings 16 formed in the plate 15. The purpose of which will also be hereinafter more fully described. The upper ends of the bolts 30 have suitable thumb pieces or wing shaped ends 32, by means of which the bolts 30 can be readily turned. It is also to be noted that the pusher plate 28 is slidably mounted on the bolts 30 for movement toward and away from the plates 15 and 25. The plate 28 can be either made in one piece or in a plurality of sections 33 as shown. Where there is a number of pins to be placed into the mold it is preferable that the plate 28 be formed in sections, as shown, in order that portions of the plate may be pushed down independently of the other portions in order to prevent the forcing of the mold out of shape. As shown the sections 33 are provided with suitable interfitting tongues and notches 34 and 35. The plate 28 is provided at its longitudinal center with a row of guide openings 36 which are adapted to slidably receive the guide posts 37, which are anchored in the openings 24 in the lower plate 15. These guide posts 37 extend through the openings 27, which are formed relatively large in order to permit movement of the plate 25 in respect to the guide posts.

The guides D are of substantially cylindrical frusto-conical formation, but it is to be understood that the same can be of any desired shape and the same are provided with the longitudinally extending bores 38, which terminate short of one of the ends thereof, for receiving the guide pins 19.

In use of the improved jig or frame, the same is placed in an inverted position so as to rest on the supporting feet 21 and the bolts 30 are operated so as to move the plate 25 to such position that the openings 26 thereof will align with the opening 16 in the plate 15. The pins B, which are to be cast in with the piano plate are placed through the aligned openings 16 and 26 until the same come into engagement with the inner surface of the pusher plate 28. After the jig or frame has been loaded the bolts 30 are again actuated so as to move the plate 25 so as to dispose the openings 26 thereof out of alignment with the openings 16 of the plate 15. This will move the pins B away from the openings 16, which effectively retains the pins B in position against accidental displacement.

The guides D are set on the pattern at the desired distance apart, that is the distance between the pins 19 formed on the jig and if so desired the pattern may be provided with suitable guides or guide pins (not shown in the drawing) for the guides D. The green sand is then placed around the pattern, and after the impression is made, the pattern is removed in the ordinary manner leaving the guides D embedded in the green sand.

The jig or frame A is then grasped in the hands of the user and the guide pins 19 are slid into the bores 38 of the guides D. The plate 28 is then actuated in order to 1,440,040 force the pins B into the mold. Prior to the actuation of the plate 28 the bolts 30 are turned so as to move the guide and locking plate 25 in order to bring the openings 26 therein into alignment with the openings 16. It can be seen that the plate 15 is placed in engagement with one face of the impression in the mold and that the pins may be readily forced into the mold by the plate 28. The pins will project out of the mold into the impression, a distance equal to the thickness of the plates 15 and 25. After all of the pins have been forced into the mold, the jig is removed as well as the guides D and suitable plugs are inserted in the holes in the mold left by the guides. The hot metal is then poured into the mold in the usual manner and it can be seen that the pins will be cast in with the piano plate.

From the foregoing description, it can be seen that a novel and simple device has been provided for easily placing piano string pins in place on piano plates during the casting thereof, thereby eliminating the difficulty and trouble heretofore experienced in placing the pins in position and permitting the pins to be placed in position by unskilled labor.

Changes in details may be made without departing from the spirit or scope of this invention, but what I claim as new is, 1. A jig for placing pins in position in a mold comprising a guide plate, guide pins carried by the plate, the guide plate having a plurality of string pin receiving openings formed therein, and a pusher plate slidably associated with the guide plate for engaging the string pin to force the same through the openings in the guide plate.

2. A jig for forcing pins into position in a mold comprising a guide plate having a plurality of guide openings therein for receiving the pins, guide posts carried by the plate, a pusher plate slidably mounted upon the guide posts arranged for movement toward and away from the guide plate for forcing the pins through the guide openings therein, and guide stems carried by the guide plates.

3. A jig for placing pins into position in a mold utilized for casting of piano plates comprising a guide plate having a plurality of pin receiving openings formed therein, upstanding guide posts carried by the guide plate, a locking and guide plate mounted upon the posts and arranged adjacent to the first mentioned guide plate and having a plurality of openings formed therein adapted to be brought into and out of alignment with the pin openings formed in the first mentioned guide plate, and a pusher plate carried by the guide posts and arranged for movement toward and away from the locking and guide plate.

4. A jig for forcing string pins for piano plates in a mold in correct formation comprising a guide plate having a plurality of openings formed therein to receive the string pins, supporting legs carried by one face of the plate and guide stems carried by the opposite face of the plate, a pusher plate arranged for movement toward and away from the guide plate, bolts rotatably carried by the pusher and guide plates, the guide plate being also slidably mounted upon the bolts, eccentrics secured to the bolts, a locking and guide plate arranged adjacent to the inner surface of the first mentioned guide plate having a plurality of string pin receiving openings formed therein adapted to be moved into and out of alignment with the string pin receiving opening formed in the first mentioned guide plate, the guide and locking plates having enlarged openings formed therein arranged to receive said eccentrics.

5. In a jig for forcing piano string pins in position in a mold for casting piano plates, an elongated guide plate having a plurality of string pin receiving openings formed therein, a pair of rotatable bolts carried by one face of the plate, eccentrics secured to the bolts, an elongated guide and locking plate arranged adjacent to the inner surface of the first mentioned guide plate having a plurality of string pin receiving openings formed therein arranged for movement into and out of alignment with the string pin receiving openings formed in the first mentioned guide plate, the guide and locking plate having enlarged openings formed therein arranged to receive the eccentrics, a sectional pusher plate slidably mounted upon the bolts arranged for movement toward and away from the guide and locking plate, and a plurality of guide posts secured to the first mentioned guideplate, the pusher plate having openings formed therein arranged to snugly and slidably receive the guide posts, and the guiding and locking plates having enlarged openings therein arranged to receive the posts.

6. A jig for placing piano string pins in position in a mold for casting piano plates comprising in combination an elongated plate having a plurality of string pin guiding openings formed transversely therethrough, guide stems carried by said plate extending from one face thereof with their axes parallel to the axes of said pin guiding openings, means for moving the string pins in the guiding openings of said plate so as to project them from the same side of said plate as said guide stems, and detachable guides for said guide pins adapted to be disposed in the mold.

7. That step in the method of placing pins in a mold for casting piano plates consisting of placing guides on the pattern, ramming the sand around the pattern and guides, and placing a jig having guide stems in engagement with one face of the impression with the stems in the guides, the jig supporting a plurality of pins, pushing the pins in the mold, and removing the guides and jig, leaving the pins in the mold.

8. A jig for forcing string pins for piano plates in a mold in correct formation comprising a guide plate having a plurality of openings formed therein to receive the string pins, a pusher plate arranged for movement toward and away from the guide plate, bolts rotatably carried by the pusher and guide plates, eccentrics secured to the bolts, a locking and guide plate arranged adjacent to the inner surface of the first mentioned guide plate having a plurality of string pin receiving openings formed therein adapted to move into and out of alignment with the string pin receiving openings formed in the first mentioned guide plate, the guide and locking plates having enlarged openings formed therein arranged to receive said eccentrics.

9. A jig for placing pins in position in a mold, comprising a guide plate having a plurality of pin guiding openings therein, a pusher plate movable toward said guide plate adapted to move the pins in said openings therein, and means for steadying said pins between said guide and pusher plates.

10. A jig for placing pins in position in a mold comprising a guide plate having a plurality of pin guiding openings therein, a pusher plate movable toward said guide plate adapted to move the pins in said openings therein, guide posts carried by said guide plates associated with said pusher plate to guide it in its movement toward said guide plate and in a plane parallel to the axes of said pin guiding openings therein, and means for steadying said pins between said guide and pusher plates.

11. A jig for placing pins in a mold comprising a guide plate having a plurality of pin guiding openings therein, a pusher plate movable toward said guide plate adapted to move the pins in said openings therein, and guide posts carried by said guide plates associated with said pusher plate to guide it in its movement toward said guide plate and in a plane parallel to the axes of said pin guiding openings therein.

HENRY A. WAHLEN.